July 15, 1947.  H. W. WASHBURN ET AL  2,423,864
VARIABLE REACTANCE
Filed Feb. 26, 1943   3 Sheets-Sheet 1
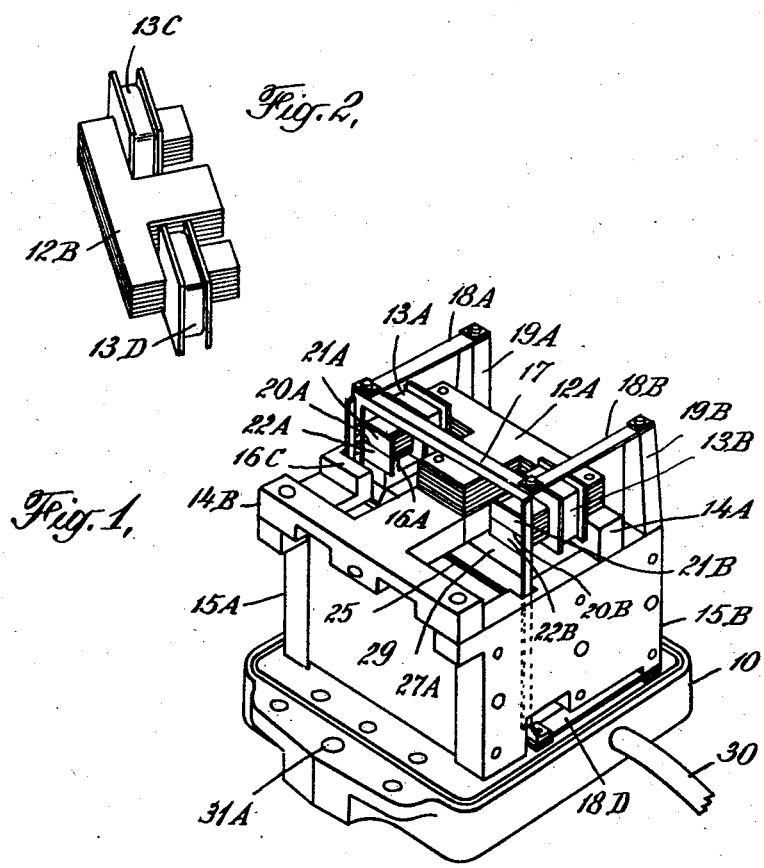
INVENTORS
Harold W. Washburn
Edmund E. Hoskins
BY
ATTORNEYS

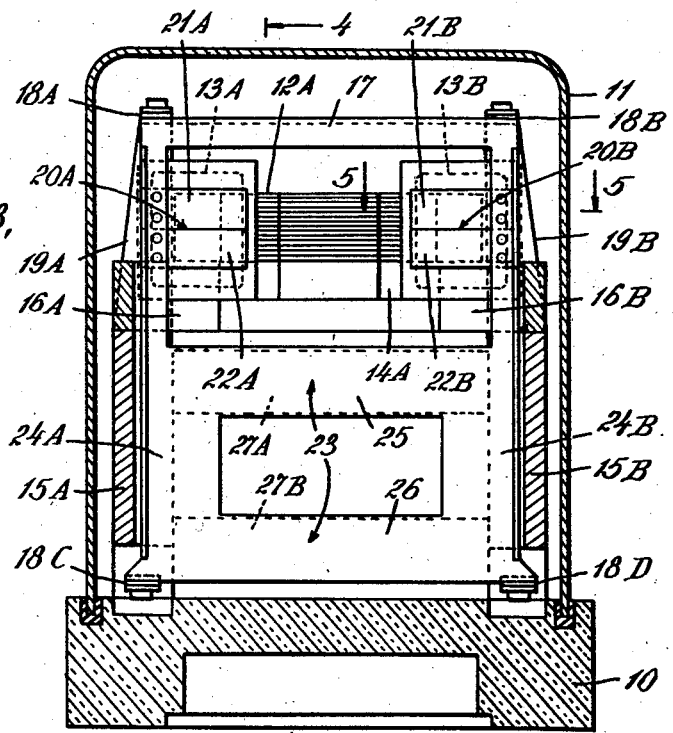
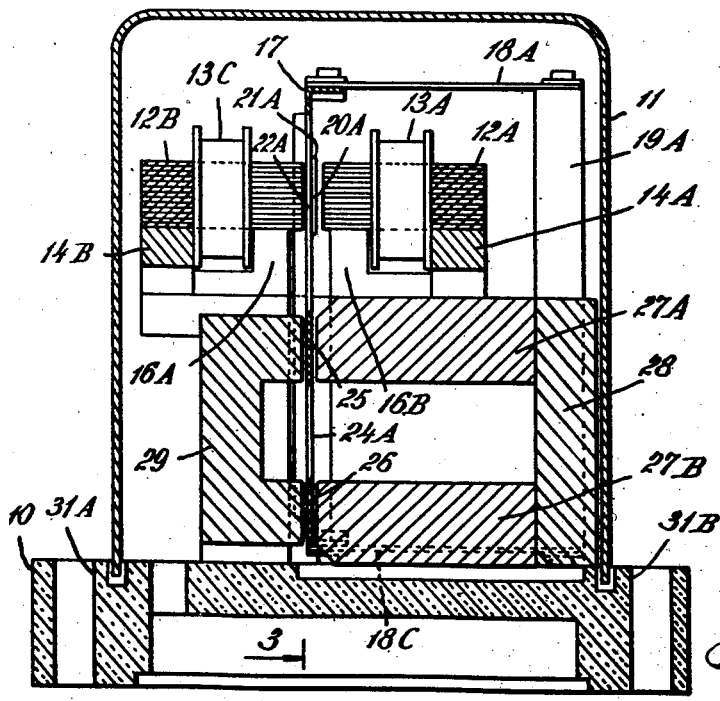

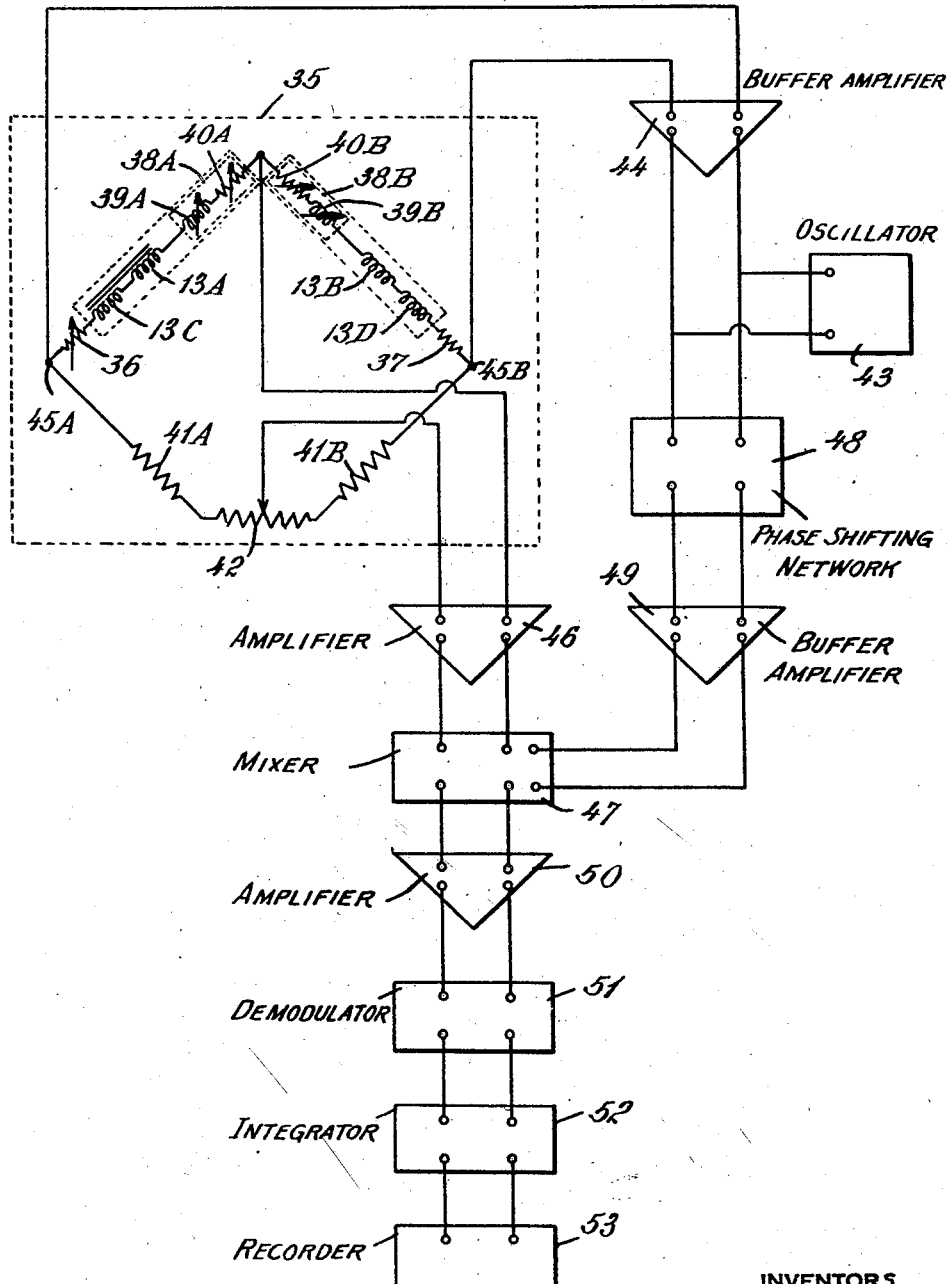

Patented July 15, 1947

2,423,864

UNITED STATES PATENT OFFICE 2,423,864

VARIABLE REACTANCE

Harold W. Washburn and Edmund E. Hoskins, Pasadena, Calif., assignors to Consolidated Engineering Corporation, Pasadena, Calif., a corporation of California Application February 26, 1943, Serial No. 477,320

11 Claims. (Cl. 171—119)

This invention is concerned with pick-ups and particularly with pick-ups adapted to determine mechanical displacement, including acceleration and velocity. It may be employed as an accelerometer, as a seismometer, or even as a displacement gauge.

The pick-up of our invention is of the variable reluctance constant dielectric gap type but, because of its structure, is unusually sensitive. In its preferred form, it is of light weight with a relatively high resonance frequency and has a damping coefficient which is substantially invariable with temperature. Moreover, in its preferred form, the apparatus is such that an undesired modulation of a carrier frequency may be avoided.

Pick-ups which determine mechanical displacement, i. e. vibration of mechanical masses, etc., have numerous applications. Thus, pick-ups are employed as seismometers in seismic prospecting and also are employed to determine vibration in engines, vehicles, etc., as well as to determine the displacement of a body, say the diaphragm of a pressure gauge, due to the action of a force upon it. In such applications, it is desirable that the pick-up be light in weight to facilitate transportation and handling and also because in many instances the use of a heavy pick-up will result in a change in the vibration which the pick-up is intended to measure. Generally speaking, pick-ups that are light in weight tend to be insufficiently rugged and generally unreliable, especially if they are intended to be of high sensitivity. However, as the result of our investigations, we have developed a pick-up which combines lightness in weight with ruggedness and high sensitivity, together with other desirable characteristics.

As indicated above, the pick-up of our invention is of the variable reluctance type and is adapted to determine mechanical displacement. It is provided with a magnetic circuit including a section of relatively low reluctance per unit length, a coil mounted in inductive relationship with the section, and means for determining a change in impedance of the coil. In addition, the apparatus includes the combination which comprises a movable armature having two members in the field of the section of low reluctance. The members have different magnetic or electrical properties and preferably both. Thus one of the members may be of high and the other of low electrical conductivity or paramagnetic susceptibility. Preferably one of these members, say a soft iron member, has relatively high paramagnetic susceptibility, low retentivity and relatively high electrical resistance. In such case, the other member preferably is of non-magnetic material (the term non-magnetic being employed to include diamagnetic material) and has relatively low electrical resistance. Thus, the second member may be of copper. The members should be so counted on the armature that one tends to move out of the field of the section of low reluctance as the other moves into this field and means are provided for permitting movement of the armature in response to the movement of the body the displacement of which is to be determined.

In one aspect, the invention contemplates an apparatus of the type described above with two sections of relatively low reluctance per unit length, with two tabs mounted respectively in the fields of the two sections and movable in a direction transverse to the lines of force of the respective magnetic fields of the sections and transverse to a line joining the two sections. Preferably the two tabs are conductive and so mounted that one tab tends to move into the field of its section as the other tab moves out of the field of its section.

In its preferred form, the apparatus of our invention has two sections of relatively low reluctance per unit length in its magnetic circuit. A pair of coils are mounted respectively in fixed inductive relationship with each section and means are provided for determining changes in the difference in impedance between the two coils. In such an apparatus, our invention contemplates a special type of armature which is movable with respect to the two sections. The armature carries two sets of members, one set within the field of each of the sections of low reluctance. One member of each set has relatively high paramagnetic susceptibility, low retentivity and high electrical resistance, and the other member of each set is non-magnetic and of relatively low electrical resistance. Both sets are so mounted that one member of each set tends to move into the field of the adjacent section as the other member of this set moves out, but the members of one set are disposed in reverse position as compared with the members of the other set so that the paramagnetic member of one set tends to move into the field of its section at the same time that the paramagnetic member of the other set tends to move out of the field of its section. As in the previous instance, means are provided for moving the armature with its attached members in response to movement of the body the displacement of which is to be determined.

In the preferred form of our apparatus, the armature carries a damping winding and the apparatus is provided with a magnet (preferably permanent) which acts thereon. Conveniently, the armature is in the form of a resiliently suspended frame that includes a section which forms a closed metallic circuit and so acts as the damping winding.

These and other features of our invention will be more thoroughly understood in the light of the following detailed description, taken in conjunction with the accompanying drawings, in which:

Fig. 1 is a pictorial view of the pick-up partially assembled;

Fig. 2 shows one of the laminated cores of the apparatus of Fig. 1, carrying a pair of inductance coils;

Fig. 3 is a sectional elevation through the apparatus of Fig. 1, taken along the line 3—3 of Fig. 4;

Fig. 4 is a sectional elevation through the apparatus of Fig. 1, taken at right angles to the section of Fig. 3, or along the line 4—4 of Fig. 3;

Fig. 5 is a cross-section of part of the armature frame taken along the line 5—5 of Fig. 3; and Fig. 6 is a schematic wiring diagram illustrating a circuit in which the pick-up of Figs. 1 to 5 is employed.

Referring now to the drawings, it will be observed that the pick-up includes a base 10 over which a cover 11 (see Figs. 3 and 4) is disposed.

The appartus may be operated in any position but will be described hereinafter as though the base were disposed horizontally.

The base and the cover enclose the three essential systems of the apparatus, namely, the magnetic system, the seismic system and the damping system.

The magnetic system of the apparatus includes a pair of laminated E-shaped soft-iron cores 12A, 12B. The center leg of each is slightly longer than the end legs and the E's are mounted horizontally face to face with the center legs in juxtaposition, so that there are substantially equal gaps between the opposing outside legs. The outside legs of each E carry inductance coils 13A, 13B, 13C, 13D. In each instance, the coil is wound around the leg.

Each core is supported rigidly on an aluminum T 14A, 14B with the leg of the T matching the center leg of the E. The T's are disposed horizontally with the butts of the two legs in juxtaposition. The cross of each T rests on and is rigidly supported by a pair of main end supports 15A, 15B, which are vertically disposed plates fastened to the base. The outside legs or poles of each E-shaped laminated core are rigidly held in position by pole tip supports 16A, 16B, 16C, 16D, which in each case is attached rigidly to a main end support so that the dimensions of the air gaps between the poles are maintained constant.

The seismic system of the pick-up comprises an armature 17. This is resiliently suspended by an upper pair of horizontally disposed leaf springs 18A, 18B from a pair of uprights 19A, 19B that extend upwardly from the main end supports and a lower pair of leaf springs 18C, 18D. The armature hangs vertically between opposing pole pieces from the free ends of the leaf springs. Attached to the armature and disposed respectively between the opposing pairs of pole pieces are armature plates 20A, 20B. Each armature plate comprises two tabs of different magnetic and electrical characteristics placed one above the other in the gap. In each gap one of the tabs is made of a material (say soft iron) of relatively high paramagnetic or ferromagnetic susceptibility, low retentivity and relatively high electrical resistance and the other is made of a non-magnetic or a relatively highly diamagnetic material of relatively low electrical resistance (say copper). By "electrical resistance" we mean the electrical resistance to eddy currents, it being understood that so far as electrical characteristics of the tabs are concerned, a thick tab of high specific resistivity is equivalent to a thin tab of low specific resistivity.

To consider the tabs in greater detail, each is a vertically disposed rectangular piece, and in each case the tabs of a set are placed next to each other in the same vertical plane. However, in one gap the tab of paramagnetic material is uppermost while in the other gap the non-magnetic tab is uppermost. Thus, in the armature plate 20A, the upper tab 21A is of soft iron while the lower tab 22A is of copper. In the other armature plate 20B, the upper tab 21B is of copper and the lower tab 22B is of soft iron.

By virtue of the foregoing relationship of the tabs, the magnetic reluctance of one air gap increases while that of the other gap decreases with a movement of the armature upward or downward relative to the case. As the reluctance in one gap decreases, the apparent inductance of the coils wound around the poles at the gap increases. Thus the movement of an iron tab into the magnetic field at an air gap increases the inductance of the neighboring coils and at the same time electrical losses due to eddy currents in the copper tab in the same air gap decrease, the result being an apparent increase in the electrical resistance in series with the coils associated with the air gap. In other words the effect of the movement of the iron tab and the copper tab of a given armature plate are both in a direction such as to effect the apparent impedance change of the coils surrounding the pole tips that form the gap in which the tabs are disposed; and this change is greater than it would be if only the iron tab or the copper tab were present.

As will be apparent hereinafter, from a discussion of Fig. 6, the impedance coils are so connected in a bridge that the impedance changes are additive.

The structure of the armature is best understood through reference to Figs. 3 and 4. Referring to these, it will be observed that the armature is of generally rectangular shape with a cut-out center and with ears at its upper and lower corners for connection to the ends of the leaf springs. The armature is made of metal and has two side sections 24A, 24B which extend almost to the base of the apparatus. The armature plates in the air gaps are fastened to these side sections in the upper portion of the apparatus. The lower portion of the armature comprises a damping winding 23 formed of the lower portions of the two side sections 24A, 24B, a horizontal intermediate bar 25 and a horizontal bottom bar 26. Thus, the bottom and intermediate bar and the lower portions of the two side sections of the armature form a closed electrical conductor which constitutes the damping winding.

The balance of the damping system comprises a pair of horizontally disposed permanent magnets 27A, 27B, disposed one above the other and linked at their rear poles by a soft iron bar 28. The lower permanent magnet is disposed on the same level as the bottom bar of the damping winding while the top permanent magnet is disposed at the same level as the intermediate bar of the damping winding. The magnetic linkage of the magnets is completed by a vertically disposed channel shaped section 29 of soft iron disposed on the opposite side of the damping winding from the two magnets.

One of the permanent magnets has its north pole adjacent the damping winding and the other has its south pole adjacent the winding, so that the two magnetic forces provided by the permanent magnets cooperate to maintain a strong magnetic field in the air gaps between the magnets and the upper and lower ends of the soft iron channel section.

The main or end supports and the pole tip supports are slotted vertically on the inside, and the two side sections 24A, 24B of the armature are free to move in these slots.

A three conductor cable 30 is connected to the base of the apparatus and carries wires which are connected to the inductance coils.

The pick-up may be fixed to a body (whose movement, for example vibration, is to be studied) by bolts (not shown) which pass through vertical bores 31A, 31B in the base.

Movement of the body brings about movement of the seismic mass relative to the base of the apparatus. As the seismic mass moves two equal and opposite electromotive forces are induced in the intermediate and lower bar sections of the damping coil and these electromotive forces cooperate to produce a circulating electric current therein. The total resistance in this damping winding, the magnitude of the flux produced by the permanent magnets and the resistance of the damping winding are so correlated that the damping coefficient of the pick-up is established at a suitable value, say 70% of that required to produce critical damping.

In order to detect relative motion of the seismic mass to the rest of the apparatus A. C. voltages of carrier frequency, i. e. of a frequency that is high compared to the frequency of the vibrations to be detected, are applied to the inductance coils. Under these circumstances, the impedance changes resulting from the vibration bring about a modulation of the voltage across each pair of coils. A circuit for detecting this modulation and hence for detecting the mechanical displacement which caused it is shown in Fig. 6.

Referring to Fig. 6, it will be observed that the inductance coils of the pick-up are connected in a bridge 35. One pair of coils 13A, 13C on opposite sides of the same air gap are connected in one arm of the bridge and the coils 13B, 13D on opposite sides of the other air gap are connected in the other arm of the same branch of the bridge. One arm of the bridge is provided with a variable resistance 36 connected in series with the inductance coils in that arm of the bridge, while the other arm of the same branch of the bridge has a fixed resistance 37 connected in series with its inductance coils. The function of the resistance 36, 37 is to equalize the Qs (reluctance-resistance ratios) in the two arms of the bridge. Each of those arms of the bridge also contains a variable impedance 38A, 38B in series with the inductance coils. Thus, the variable impedance 38A comprises a variable inductance 39A and a variable resistance 40A, while the variable impedance 38B consists of a variable inductance 39B and a variable resistance 40B. The two variable impedances represent the part of the impedances of the respective pairs of coils which change as the result of the armature movement and the changes in inductance are substantially proportional to the changes in impedance.

The two arms of the other branch of the bridge network each include bridge balancing resistances 41A, 41B with a conventional sliding resistance 42 provided between the sides of the bridge.

An oscillator 43 is provided as a power source and the output of this oscillator is applied through a buffer amplifier 44 to input terminals 45A, 45B of the bridge network.

The output of the bridge is transmitted through an amplifier 46 to a mixer 47. A signal of carrier frequency is also applied to the mixer, this being derived from the oscillator 43 through a phase shifting network 48 and a buffer amplifier 49.

The output of the mixer is amplified by means of an amplifier 50, rectified by a demodulator 51, and passed through an integrator 52 (all of conventional design) to a conventional recorder 53.

In operating the apparatus, the bridge is balanced in the "no vibration" condition and the phase shifting network is adjusted so that the carrier wave applied to the mixer from the oscillator is either in phase, or 180° out of phase, with any carrier wave that would be applied to the mixer if the bridge were slightly unbalanced. Under these conditions, when the amplitude of the oscillator voltage applied to the mixer is large compared to the amplitude of the bridge output, the degree of modulation of the carrier voltage appearing at the output of the mixer circuit is proportional to the difference in impedance in the two sides of the bridge. The percentage of the modulation is also proportional to the amplitude of acceleration of the base if the resonant frequency of the seismic mass and spring combination is about twice that of any of the frequency components of the motion being detected.

The fact that the pick-up may be made of light weight (¾ lb.) and at the same time have a relatively high resonant frequency is due to several factors in the design of the apparatus, including the efficient magnetic structure of the damping system and the structure and light weight of the seismic mass, i. e. the armature plus about ¼ of the weight of the supporting springs.

Undesired modulation of the carrier frequency is avoided by eliminating vibration of the pole tips, these being held rigidly to the main body of the pick-up and also by eliminating vibration of the armature plates, which are held rigidly to the armature. If desired, the inner edges of each armature plate may be anchored by narrow vertical bars (not shown) extending from the upper bar 17, to the intermediate bar 25 and in line with the inner edges.

If desired, although with some sacrifice of sensitivity, either the tabs of high susceptibility, or the tabs of non-magnetic material may be omitted in the device of our invention that is provided with two armature plates, i. e. two gaps, provided that the remaining tabs maintain the positions shown in the drawing, so that one tab moves into one gap while the other tab moves out of the other gap.

If the apparatus is employed to determine static displacement, as distinguished from vibration (for example in a pressure gauge), the armature must be movable but need not be resiliently suspended, and may be connected directly to the movable body, say the diaphragm of a pressure gauge.

We claim:

1. In a pick-up device adapted to determine displacement of a body and including a magnetic circuit including a section of relatively low reluctance per unit length, a coil mounted in inductive relationship with the section, the improvement which comprises a resiliently supported armature movable in response to the displacement of the body and having two members in the field of the section and movable transverse to the lines of the force of the field, one member being of relatively high paramagnetic susceptibility, low retentivity and relatively high electrical resistance and the other being of a non-magnetic material of low electrical resistance, the members being so mounted on the armature that one tends to move out of the field of the section as the other moves into the field.

2. In a pick-up device adapted to determine displacement of a body and provided with a magnetic circuit including two sections of relatively low reluctance per unit length, coils mounted respectively in fixed inductive relationship with the two sections, and an armature movable in response to a displacement of the body, the combination which comprises two sets of members mounted on the armature, each set being within the field of one of the sections and so mounted that one member of the set tends to move into the field as the other member moves out, one member of each set being of relatively high paramagnetic susceptibility, low retentivity and high electrical resistance, and the other member of the set being non-magnetic and of relatively low electrical resistance, the members of one set being disposed in reverse position on the armature to the members of the other set, so that the paramagnetic member of one set tends to move into the field of its section while the paramagnetic member of the other set tends to move out of the field of its section.

3. In a pick-up device adapted to determine displacement of a body and provided with a magnetic circuit including two sections of relatively low reluctance per unit length, coils mounted respectively in fixed inductive relationship with the two sections, and an armature inductively associated with the two sections and movable in response to a displacement of the body, the combination which comprises two sets of members mounted on the armature, each set being within the field of one of the sections and so mounted that one member tends to move into the field as the other member moves out, one member of each set being of relatively high paramagnetic susceptibility, low retentivity and high electrical resistance, and the other member of the set being non-magnetic and of relatively low electrical resistance, the members of one set being disposed in reverse position on the armature to the members of the other set, so that the paramagnetic member of one set tends to move into the field of its section while the paramagnetic member of the other set tends to move out of the field of its section, a permanent magnet, and a damping winding mounted on the armature in the field of the permanent magnet.

4. In a pick-up device adapted to determine displacement of a body and having a magnetic circuit including sections of relatively low reluctance per unit length, with an air-gap therebetween, a coil mounted in fixed inductive relationship with a section, and the combination which comprises an armature movable transverse to the magnetic circuit and disposed in the gap and having two members therein, one member being of relatively high paramagnetic susceptibility, low retentivity and relatively high electrical resistance and the other being of a non-magnetic material of low electrical resistance, the members being so mounted on the armature that one tends to move transversely out of the field of the section as the other moves transversely into the field, and means for holding the sections rigidly with respect to each other to maintain constant the air gap.

5. In a pick-up adapted to determine displacement of a body and provided with a pair of pole pieces separated by a dielectric gap in which an armature is moved in response to the displacement of the body, and a coil mounted in inductive relationship with a pole piece, the improvement which comprises two members mounted on the armature in the gap so that one tends to move into the gap as the other moves out, one member being of relatively high paramagnetic susceptibility, low retentivity and relatively high electrical resistance and the other being of non-magnetic material of relatively low electrical resistance and both members being movable transverse to a straight line connecting the pole pieces.

6. In a pick-up device adapted to determine displacement of a body and provided with two pairs of pole pieces which define a pair of dielectric gaps in which an armature is moved in response to a displacement of the body, coils mounted respectively, in inductive relationship with a pole piece adjacent each gap, the combination which comprises two sets of members mounted on the armature respectively in the two gaps, one member of each set being of relatively high paramagnetic susceptibility, low retentivity and relatively high electrical resistance, and the other being of diamagnetic material of relatively low electrical resistance, the members being so mounted on the armature that the paramagnetic member of one set tends to move into its gap while the diamagnetic member tends to move out and while the paramagnetic member of the other set tends to move out of its gap while the diamagnetic member of the other set tends to move in.

7. In a device adapted to determine displacement of a body and provided with a magnetic circuit including two sections of relatively low reluctance per unit length, coils mounted respectively in fixed inductive relationship with the two sections, and an armature movable in response to the displacement, the combination which comprises two conductive tabs of different paramagnetic susceptibility mounted on the armature respectively within the fields of the two sections and so that one tab tends to move into the field of its section as the other tab moves out of the field of its section.

8. In a device adapted to determine displacement of a body and provided with a magnetic circuit including two sections of relatively low reluctance per unit length, coils mounted respectively in fixed inductive relationship with the two sections, the combination which comprises two conductive tabs movably mounted respectively within the fields of the two sections and movable in a direction transverse to the lines of force of the respective fields and transverse to a straight line joining the two sections.

9. In a pick-up adapted to determine displacement of a body and provided with a pair of pole pieces separated by a dielectric gap in which an armature is moved in response to the displacement of the body, and a coil mounted in inductive relationship with a pole piece, the improvement which comprises two members mounted on the armature in the gap so that one tends to move into the gap as the other moves out, the members being rigidly held on the armature respectively at the sides thereof that extend in the direction of movement, the two members having different electrical or magnetic properties.

10. A pick-up comprising cores of a magnetic material with two sets of pole pieces providing two air gaps in the magnetic circuit of the cores, coils wound respectively around the cores, an armature readily movable with respect to said cores, said armature carrying a member of magnetic material and an electrically conducting member of less magnetic material in each gap and being adapted to move transversely with respect to the air gaps, the relative positions of the members at one gap being reversed from their positions at the other gap so that when a magnetic member is moving more completely into one gap the less magnetic member is similarly moving more completely into the other gap and vice versa.

11. In a pick-up the combination comprising two cores of magnetic material defining two air gaps, coils wound around said cores defining said air gaps an armature movable relative to said air gaps, said armature carrying a magnetic member and a relatively non-magnetic electrical conducting member at each air gap, the relative positions of the two members at one gap being reversed from their positions at the other gap so that when a magnetic member of one pair is moving more completely into its associated gap, the non-magnetic member of the other pair is moving more completely into the other gap.

HAROLD W. WASHBURN.
EDMUND E. HOSKINS.

REFERENCES CITED

The following references are of record in the file of this patent:

UNITED STATES PATENTS

| Number | Name | Date |
|---|---|---|
| 1,706,837 | Bailey | Mar. 26, 1929 |
| 1,689,339 | Harrison | Oct. 30, 1928 |
| 2,057,458 | Tubbs | Oct. 13, 1936 |
| 377,217 | Thomson | Jan. 31, 1888 |
| 2,013,106 | Nagel et al. | Sept. 3, 1935 |
| 2,130,213 | Wolf et al. | Sept. 13, 1938 |
| 2,210,970 | Bonell | Aug. 13, 1940 |
| 2,305,268 | Minor et al. | Dec. 15, 1942 |
| 1,516,947 | Beindorf | Nov. 25, 1924 |
| 1,948,104 | Firestone et al. | Feb. 20, 1934 |
| 1,961,007 | Marvin | May 29, 1934 |
| 2,269,453 | Gayhart | Jan. 13, 1942 |
| 2,271,864 | Honnell et al. | Feb. 3, 1942 |
| 2,338,732 | Nosker | Jan. 11, 1944 |

FOREIGN PATENTS

| Number | Country | Date |
|---|---|---|
| 560,396 | France | July 9, 1923 |
| 245,805 | Great Britain | Jan. 20, 1927 |